(12) United States Patent
Saito et al.

(10) Patent No.: US 8,941,362 B2
(45) Date of Patent: Jan. 27, 2015

(54) CHARGING APPARATUS, AND CHARGE CONTROL METHOD

(75) Inventors: Junko Saito, Kanagawa (JP); Hiroshi Kawashima, Tokyo (JP); Kei Yamashita, Kanagawa (JP); Tomoyuki Ono, Saitama (JP); Masaya Kimura, Chiba (JP); Kayoko Tanaka, Tokyo (JP); Hideki Noma, Kanagawa (JP); Jin Pan, Tokyo (JP); Yukiyoshi Hirose, Tokyo (JP); Ryoki Honjo, Kanagawa (JP); Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 283 days.

(21) Appl. No.: 13/168,677

(22) Filed: Jun. 24, 2011

(65) Prior Publication Data

US 2012/0007565 A1    Jan. 12, 2012

(30) Foreign Application Priority Data

Jul. 7, 2010   (JP) ................................ P2010-155113

(51) Int. Cl.
H02J 7/00        (2006.01)
(52) U.S. Cl.
CPC ..................................... *H02J 7/0052* (2013.01)
USPC ......................................................... 320/155
(58) Field of Classification Search
CPC ........ H02J 7/0052; H02J 7/041; H02J 7/0073
USPC ................................................ 320/155, 133
See application file for complete search history.

(56) References Cited

U.S. PATENT DOCUMENTS

| | | | | |
|---|---|---|---|---|
| 5,754,029 A * | 5/1998 | Mann et al. | ................... | 320/106 |
| 6,771,047 B1 * | 8/2004 | Ogonowsky | ................... | 320/128 |
| 7,570,015 B2 * | 8/2009 | Bansal et al. | ................... | 320/106 |
| 8,054,192 B2 * | 11/2011 | Grigsby et al. | ................... | 340/663 |
| 8,224,596 B2 * | 7/2012 | Agrawal et al. | ................... | 702/63 |
| 8,310,205 B1 * | 11/2012 | Hamburgen | ................... | 320/130 |
| 2005/0248313 A1 * | 11/2005 | Thorland | ................... | 320/130 |
| 2009/0165022 A1 * | 6/2009 | Madsen et al. | ................... | 719/318 |
| 2010/0123436 A1 * | 5/2010 | Herrod et al. | ................... | 320/132 |
| 2010/0164439 A1 * | 7/2010 | Ido | ................... | 320/155 |
| 2011/0016063 A1 * | 1/2011 | Pollack et al. | ................... | 705/412 |
| 2011/0018679 A1 * | 1/2011 | Davis et al. | ................... | 340/3.1 |

FOREIGN PATENT DOCUMENTS

JP        2010-055226        3/2010

* cited by examiner

*Primary Examiner* — Samuel Berhanu
*Assistant Examiner* — Jerry D Robbins
(74) *Attorney, Agent, or Firm* — Finnegan, Henderson, Farabow, Garrett & Dunner, LLP

(57) ABSTRACT

There is provided a charging apparatus including a connection unit to which a device is to be connected, a charging unit for charging the device connected to the connection unit, a history acquisition unit for acquiring a history of content use stored in the device, a timing prediction unit for predicting a timing of use of the device based on the history of content use acquired by the history acquisition unit, and a charge control unit for controlling the charging unit such that the device connected to the connection unit becomes fully charged at a timing suitable for the timing predicted by the timing prediction unit.

7 Claims, 10 Drawing Sheets

CHARGING APPARATUS, AND CHARGE CONTROL METHOD

BACKGROUND

The present disclosure relates to a charging apparatus, and a charge control method.

In recent years, many portable appliances typified by mobile phones have come to be widely used. These portable appliances are provided with charge storage devices such as secondary cells. Particularly, in recent years, as a consequence of increase in the awareness of environmental issues and increase in the performance of secondary cells, the secondary cells are coming to be more often used than primary cells. The secondary cells are charge storage devices that can be used over and over again by being charged.

However, there is a limit to the number of times the secondary cells can be used (hereinafter, life). Also, it is known that the life of secondary cells is dependent on the way of charging. For example, it is known that if a secondary cell is left unused in a fully charged state, the life of the secondary cell will become short. Accordingly, various charge control methods are proposed to extend the life of the secondary cells. For example, JP 2010-55226A discloses a method of performing control such that a secondary cell becomes fully charged at a specific time.

SUMMARY

One method of extending the life of a secondary cell is to maintain, in a state where a portable appliance is not used, the secondary cell in a state where the amount of charge is about 80% (hereinafter, amount of normal charge). That is, by not charging the secondary cell to full even when a portable appliance is connected to a charging apparatus, the life of the secondary cell can be extended. On the other hand, a user will want the secondary cell to be fully charged at the time of using a portable appliance.

However, many of the portable appliances used at home, such as mobile phones, portable game machines, image capturing devices, portable music players and the like, are used irregularly. Thus, it is difficult to perform charge control such that the amount of stored charge of a secondary cell is maintained at the amount of normal charge in a situation where a portable appliance is not used by a user and such that the secondary cell becomes fully charged at a timing of the user using the portable appliance.

In light of the foregoing, it is desirable to provide a charging apparatus and a charge control method which are novel and improved, and which are capable of placing a charge storage device of a portable appliance in a fully charged state at a timing suitable for the timing of use by a user.

According to an embodiment of the present disclosure, there is provided a charging apparatus which includes a connection unit to which a device is to be connected, a charging unit for charging the device connected to the connection unit, a history acquisition unit for acquiring a history of content use stored in the device, a timing prediction unit for predicting a timing of use of the device based on the history of content use acquired by the history acquisition unit, and a charge control unit for controlling the charging unit such that the device connected to the connection unit becomes fully charged at a timing suitable for the timing predicted by the timing prediction unit.

The charging apparatus may further include a removal time range holding unit for holding a time range during which the device connected to the connection unit is removed. In this case, the timing prediction unit predicts a timing of removal of the device from the connection unit, based on a history of time range held by the removal time range holding unit.

The charge control unit may control the charging unit to achieve full charge at a timing suitable for an earlier timing of the timings predicted by the timing prediction unit based on the history of content use and based on the time range of removal of the device.

The charge control unit may control, when the device is connected to the connection unit, the charging unit to charge the device to a predetermined amount of charge that is less than full charge, regardless of the timings predicted by the timing prediction unit.

The charging apparatus may further include an information acquisition unit for acquiring information from an information source on a network. In this case, when information related to a timing of use of the device is acquired by the information acquisition unit, the timing prediction unit predicts the timing of use of the device based on the information related to a timing.

The charging apparatus may further include an image capturing device determination unit for determining whether the device connected to the connection unit is an image capturing device or not. In this case, the information acquisition unit acquires information on a weather forecast, and, when the device is determined by the image capturing device determination unit to be the image capturing device and a weather of a day corresponding to the timing predicted by the timing prediction unit is predicted to be rain based on the information on a weather forecast acquired by the information acquisition unit, the charge control unit cancels a process of controlling the charging unit, the process being for achieving full charge at a timing suitable for the timing predicted by the timing prediction unit.

The information acquisition unit may acquire information on an event schedule of a user owning the device. In this case, the timing prediction unit predicts, as the timing of use of the device, a timing that is a predetermined time before a start time of the event schedule, based on the information on an event schedule acquired by the information acquisition unit.

The charging apparatus may further include a demand prediction acquisition unit for acquiring a power demand prediction. In this case, the timing prediction unit sets a timing when a demand for power is low as the timing when the device will become fully charged, based on the power demand prediction acquired by the demand prediction acquisition unit, and the charge control unit controls the charging unit such that the device connected to the connection unit becomes fully charged at a timing suitable for the timing set by the timing prediction unit.

According to another embodiment of the present disclosure, there is provided a charge control method which includes connecting a device, acquiring a history of content use stored in the device, predicting a timing of use of the device based on the acquired history of content use, and controlling charging such that the device becomes fully charged at a timing suitable for the predicted timing.

According to another embodiment of the present disclosure, there is provided a program for causing a computer to realize the function of each structural element provided in the charging apparatus.

According to another embodiment of the present disclosure, there is provided a computer-readable recording medium in which the program is recorded.

According to the embodiments of the present disclosure described above, it is possible to place a charge storage device of a portable appliance in a fully charged state at a timing suitable for the timing of use by a user.

DETAILED DESCRIPTION OF THE EMBODIMENT(S)

Figure 1:
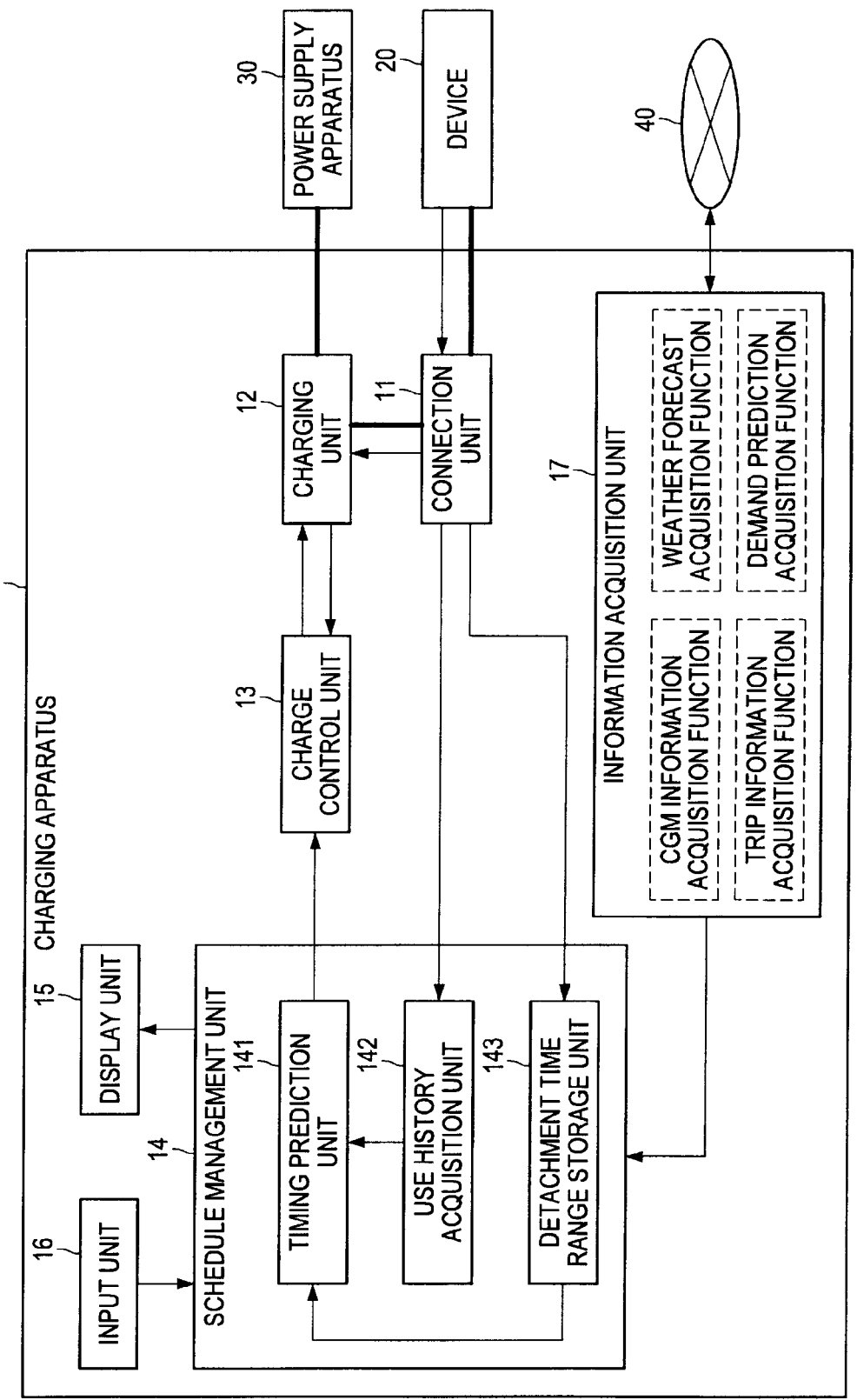
FIG. 1 is an explanatory diagram for describing a functional configuration of a charging apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Flow of Explanation]

The flow of explanation on an embodiment of the present disclosure which will be described below will be briefly stated here. First, a functional configuration of a charging apparatus 10 according to the embodiment will be described with reference to FIG. 1. Then, a functional configuration of a device 20 according to the embodiment will be described with reference to FIGS. 2 and 3.

Then, charge control methods according to the embodiment will be described with reference to FIGS. 4 to 9. Next, a hardware configuration capable of realizing functions of the charging apparatus 10 and the device 20 will be described with reference to FIG. 10. Lastly, technical ideas of the embodiment will be summarized and effects obtained by the technical ideas will be briefly described.

(Description Items)
1: Embodiment
  1-1: Functional Configuration of Charging Apparatus 10
  1-2: Functional Configuration of Device 20
    1-2-1: Content Playback Device
    1-2-2: Image Capturing Device
  1-3: Charge Control Method
    1-3-1: Charge Control Based on Content Information
    1-3-2: Charge Control Based on Removal Timing
    1-3-3: Charge Control Based on Content Information+ Removal Timing
    1-3-4: Charge Control Based on Result of Weather Forecast
    1-3-5: Charge Control Based on Event Information
    1-3-6: Charge Control Taking Demand Prediction into Account
  1-4: Hardware Configuration
2: Summary 1: Embodiment An embodiment of the present disclosure will be described. The present embodiment relates to a method of performing charge control so as to place a portable appliance in a fully charged state at a timing suitable for the timing of use of the portable appliance by a user.

[1-1: Functional Configuration of Charging Apparatus 10]

First, a functional configuration of a charging apparatus 10 according to the present embodiment will be described with reference to FIG. 1. FIG. 1 is an explanatory diagram for describing a functional configuration of the charging apparatus 10 according to the present embodiment. Additionally, in the example of FIG. 1, the charging apparatus 10 is connected to a device 20, a power supply apparatus 30, and a network 40. Additionally, the device 20 is a portable appliance used by a user or a home battery, for example. Furthermore, the power supply apparatus 30 is means for supplying power.

As shown in FIG. 1, the charging apparatus 10 is configured from a connection unit 11, a charging unit 12, a charge control unit 13, a schedule management unit 14, a display unit 15, an input unit 16, and an information acquisition unit 17. Furthermore, the schedule management unit 14 includes a timing prediction unit 141, a use history acquisition unit 142, and a detachment time range storage unit 143.

The connection unit 11 is means for connecting to the device 20. When the device 20 is physically and electrically connected to the connection unit 11, a connection notification indicating connection of the device 20 is input from the connection unit 11 to the charging unit 12. When this connection notification is input, the charging unit 12 starts charging the device 20 via the connection unit 11. At this time, the charging unit 12 receives power from the external power supply apparatus 30 and supplies the power to the device 20 via the connection unit 11.

Furthermore, when charging is started, the amount of stored charge in the device 20 is notified from the device 20 to the charging unit 12 via the connection unit 11. When the notification on the amount of stored charge is received from the device 20 via the connection unit 11, the charging unit 12 inputs the amount of stored charge in the charge control unit 13. When the amount of stored charge that is input is more than a predetermined amount of stored charge (for example, 80% of the amount of full charge), the charge control unit 13 controls the charging unit 12 to stop charging the device 20. On the other hand, when the amount of stored charge that is input is less than the predetermined amount of stored charge, the charge control unit 13 controls the charging unit 12 to continue charging the device 20 until the predetermined amount of stored charge is reached. Additionally, the charging performed until the predetermined amount of stored charge is reached will be referred to as "normal charging."

Furthermore, when the device 20 is connected to the connection unit 11, the schedule management unit 14 acquires identification information for individually identifying devices 20 (hereinafter, device ID). Furthermore, the schedule management unit 14 acquires content information from the device 20 connected via the connection unit 11, by using a function of the use history acquisition unit 142. The content information here includes information such as the time and day or the time range of playing back content such as a piece of music or a video, or the time and day or the time range of recording content such as a video, audio or the like, for example.

This content information is held for each device ID by the use history acquisition unit 142. Furthermore, the content information held by the use history acquisition unit 142 in input to the timing prediction unit 141. When the content information is input, the timing prediction unit 141 analyses the content information that is input, and predicts the timing of use of the device 20 by a user. For example, in the case a user plays back content around 8 AM to 9 AM in the morning on weekdays, the timing prediction unit 141 decides that the use of the device 20 will start by 8 AM on weekdays.

Furthermore, in the case the user records content around 10 AM every Sunday, the timing prediction unit 141 decides that the use of the device 20 will start by 10 AM on Sundays. Also, in the case the user records content on the third Sunday in April every year, the timing prediction unit 141 decides that the device 20 will be used on the third Sunday in April. In this manner, the timing prediction unit 141 analyses the content information of the past, and detects the cycle regarding the time and day, the time range or the like of use of the device 20. Then, the timing prediction unit 141 predicts the next timing of use of the device 20 based on the cycle detected from the content information of the past.

The timing predicted by the timing prediction unit 141 is input to the charge control unit 13. Additionally, information on the time and day, the time range or the like indicating the timing predicted by the timing prediction unit 141 may be displayed on the display unit 15. When the timing predicted by the timing prediction unit 141 is input, the charge control unit 13 controls the charging unit 12 such that the device 20 will become fully charged at a timing suitable for the input timing.

Incidentally, the timing predicted by the timing prediction unit 141 is the timing of use of the device 20 by a user and is not the timing of removal of the device 20 from the charging apparatus 10. Accordingly, the charge control unit 13 controls the charging unit 12 such that the device 20 becomes fully charged at a timing earlier than the timing predicted by the timing prediction unit 141 by a predetermined time. Additionally, the predetermined time for determining the timing at which the device 20 will become fully charged may be set in advance at the time of manufacture of the charging apparatus 10, for example. This predetermined time may also be set manually by the user via the input unit 16.

Now, the timing at which the device 20 will become fully charged may be set manually by the user. In this case, the user uses the input unit 16 and inputs information indicating the timing at which the device 20 will become fully charged. At this time, the information that is input using the input unit 16 is displayed on the display unit 15 and also is input to the schedule management unit 14. Then, the information on the timing input to the schedule management unit 14 is input to the charge control unit 13. In this case, the charge control unit 13 controls the charging unit 12 based on the information on the timing that is input such that the device 20 becomes fully charged at that timing.

When the device 20 is fully charged and is removed from the charging apparatus 10 by the user, the removal of the device 20 is notified from the connection unit 11 to the detachment time range storage unit 143 of the schedule management unit 14. When this notification is received, the detachment time range storage unit 143 stores, in association with the device ID, removal time information indicating the time and day, the time range or the like or the removal of the device 20. The detachment time range storage unit 143 accumulates in this manner the removal time information for each device ID every time the device 20 is removed from the charging apparatus 10. Then, when a predetermined number or more of pieces of the removal time information are accumulated, the detachment time range storage unit 143 inputs the removal time information to the timing prediction unit 141.

When the removal time information is input, the timing prediction unit 141 analyses the removal time information that is input, and detects the cycle of the time range in which the user removes the device 20. For example, in the case the device 20 is removed by the user highly frequently between 8 AM and 9 AM on weekdays, the timing prediction unit 141 predicts that the device 20 will be removed next time by the user also between 8 AM and 9 AM on a weekday. Similarly, in the case the device 20 is removed by the user highly frequently around 9 AM on Sundays, the timing prediction unit 141 predicts that the device 20 will be removed next time by the user also around 9 AM on a Sunday.

In this manner, the timing prediction unit 141 analyses the removal time information, and predicts the next removal timing based on the cycle of removal timing of the past. Then, the timing prediction unit 141 holds the next removal timing that is predicted. Additionally, when the device 20 is connected to the connection unit 11, the timing prediction unit 141 inputs the removal timing that it holds to the charge control unit 13. When the removal timing is input, the charge control unit 13 controls the charging unit 12 such that the device 20 becomes fully charged at the removal timing that is input.

Incidentally, in a case a use timing of the device 20 based on the content information is input, the charge control unit 13 compares the timing of full charge to be set based on the use timing and the removal timing. Then, the charge control unit 13 selects an earlier timing, and controls the charging unit 12 such that the device 20 becomes fully charged at the selected timing. Furthermore, when a timing of full charge is input by the user via the input unit 16, the charge control unit 13 controls the charging unit 12 such that the device 20 becomes fully charged at the timing input by the user.

Charge control based on the content information and the removal timing of the device 20 have been described above, but the charging apparatus 10 is also capable of controlling the timing of full charge of the device 20 based on information acquired from an information source on the network 40. The charging apparatus 10 is provided with the information acquisition unit 17 to realize such control. The information acquisition unit 17 includes a CGM information acquisition function, a weather forecast acquisition function, a trip information acquisition function, and a demand prediction acquisition function. Additionally, the CGM is an abbreviation for Consumer Generated Media.

First, an example of acquiring CGM information from an information source on the network 40 and using the same will be described. The CGM information is information generated by a user using the network 40. For example, information posted on a social networking service, a blog and the like are examples of the CGM information. Information related to a schedule of the user, a plan of use of the device 20 and the like may be included in such CGM information. For example, information related to an event which the user of the device 20 will be participating in or the like may be included in the CGM information. The information acquisition unit 17 acquires such CGM information by the CGM information acquisition function and inputs the same to the schedule management unit 14.

The CGM information that is input to the schedule management unit 14 is input to the timing prediction unit 141. The timing prediction unit 141 analyses the CGM information that is input, and detects information related to the timing of use of the device 20 by the user. Then, the timing prediction unit 141 predicts based on the detected information the next timing of use of the device 20. Also, the timing prediction unit 141 holds the predicted timing, and inputs the timing to the charge control unit 13 when the device 20 is connected to the connection unit 11.

When a use timing of the device 20 is input in this manner, the charge control unit 13 controls the charging unit 12 such that the device 20 becomes fully charged at a timing earlier than the timing by a predetermined time. Additionally, which of the use timing of the device 20 based on the content information, the removal timing and the use timing of the device 20 based on the CGM information is to be used may be set in advance by the user, or whichever timing that is reached the earliest may be selected.

Next, an example of acquiring trip information from an information source on the network 40 and using the same will be described. The trip information here means information whose contents are related to a trip the user is planning to take. When taking a trip, it is highly probable that the user takes a particular device 20 such as an image capturing device with him/her. Thus, the information acquisition unit 17 acquires the trip information of the user from an information source on the network 40 by the trip information acquisition function and detects the starting date/time of the trip. Also, the information acquisition unit 17 inputs the detected starting date/time to the schedule management unit 14. Then, the starting date/time of the trip input to the schedule management unit 14 is input to the timing prediction unit 141.

When the starting date/time of the trip is input, the timing prediction unit 141 predicts that the starting date/time of the trip that is input is the use timing of the device 20. Also, the timing prediction unit 141 holds the use timing that is based on the starting date/time of the trip. Then, when the device 20 is connected to the connection unit 11, the timing prediction unit 141 inputs the use timing based on the starting date/time of the trip to the charge control unit 13. Incidentally, the timing prediction unit 141 may decide whether or not the device 20 connected to the connection unit 11 is an image capturing device, and in the case it is the image capturing device, may input the use timing based on the starting date/time of the trip to the charge control unit 13.

When the use timing of the device 20 is input in this manner, the charge control unit 13 controls the charging unit 12 such that the device 20 becomes fully charged at a timing earlier than the timing by a predetermined time. Additionally, which of the use timing of the device 20 based on the content information, the removal timing and the use timing of the device 20 based on the starting date/time of the trip is to be used may be set in advance by the user, or whichever timing that is reached the earliest may be selected.

Next, an example of acquiring a weather forecast from an information source on the network 40 and using the same will be described. Additionally, this weather forecast is used in combination with the CGM information, the trip information or the like. For example, when date and time of an outdoor event that the user will be participating in are detected based on the CGM information, if only the CGM information is used, the device 20 will be fully charged at a timing suitable for the date and time regardless of the weather of the date and time. However, an outdoor event is highly likely to be cancelled in case of rain. Thus, the charging apparatus 10 refers to the weather forecast acquired by the weather forecast acquisition function of the information acquisition unit 17, and in case of rain at the date and time of the outdoor event, stops the control of achieving full charge of the device 20 at a timing suitable for the date and time of the outdoor event. The same can be said for the combination with the trip information.

Next, an example of acquiring a demand prediction from an information source on the network 40 and using the same will be described. The demand prediction here means a prediction on power demand of each specific region. Generally, there is a desire on the side of a power supplier to level power demands. Furthermore, in the summertime or the like, power supply is sometimes overwhelmed by the demand at the peak of the power demand. Also, the power price reaches its highest in the power trading at the peak of the power demand. For these reasons, performing charge control based on the demand prediction is socially and economically meaningful. For example, it is preferable to perform charge control of fully charging the device 20 while avoiding the peak time of the power demand. Additionally, setting of the timing of full charge of the device 20 based on the demand prediction is realized by a function of the timing prediction unit 141.

In the foregoing, the functional configuration of the charging apparatus 10 has been described. Additionally, the functional configuration of the charging apparatus 10 shown in FIG. 1 is only an example, and it is also possible to omit some of the structural elements. For example, the charging apparatus 10 may be configured to perform, with the information acquisition unit 17 omitted, charge control by using the use timing based on the content information and the removal timing. Also, the charging apparatus 10 may be configured to perform, with the information acquisition unit 17 and the detachment time range storage unit 143 omitted, charge control by using the use timing based on the content information. Furthermore, the charging apparatus 10 may be configured to perform, with the information acquisition unit 17 and the use history acquisition unit 142 omitted, charge control by using the removal timing.

[1-2: Functional Configuration of Device 20]

Figure 2:
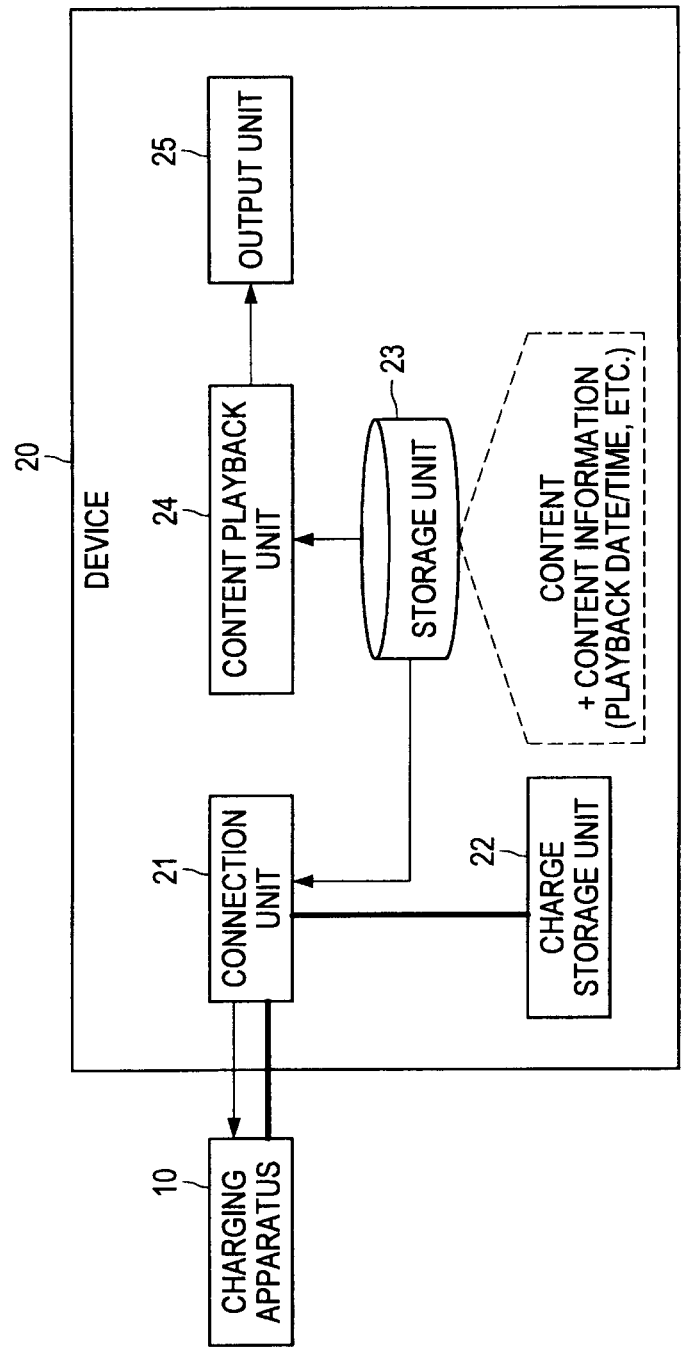
FIG. 2 is an explanatory diagram for describing a functional configuration of a device according to the embodiment.
Figure 3:
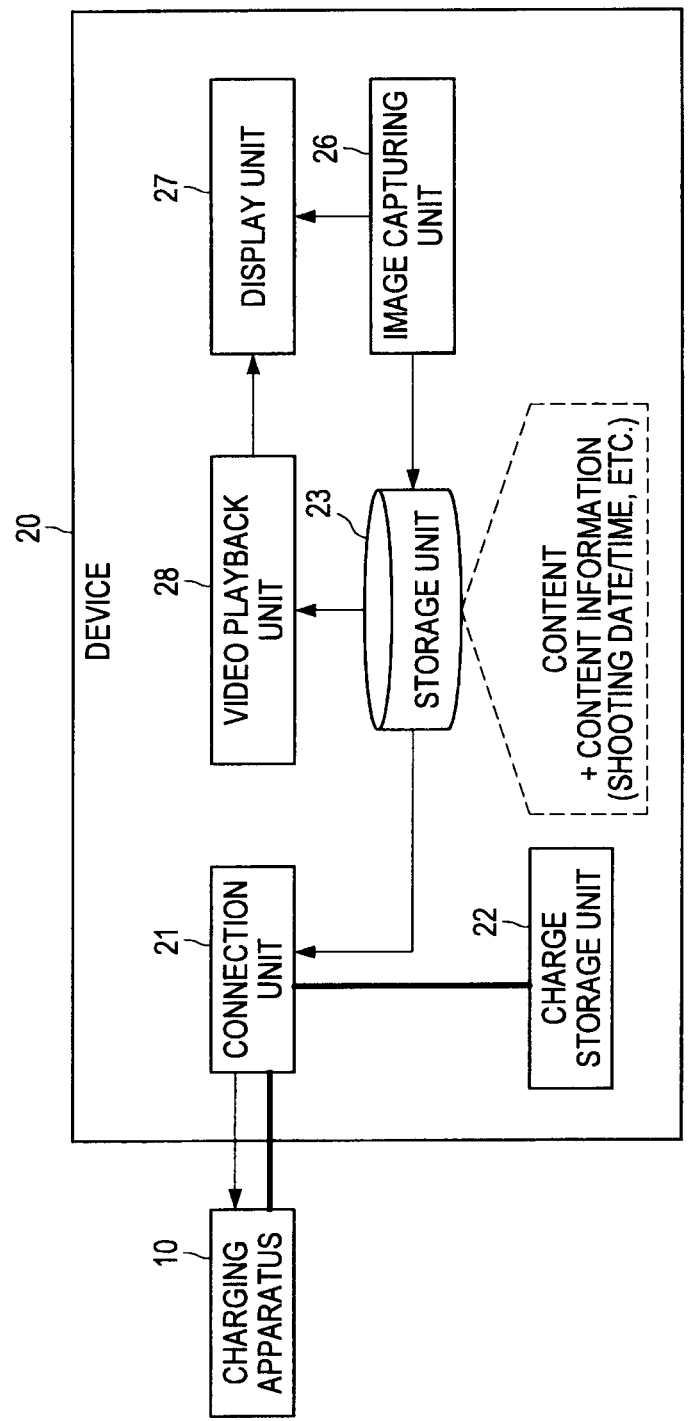
FIG. 3 is an explanatory diagram for describing a functional configuration of a device (image capturing device) according to the embodiment.

Next, functional configurations of the device 20 will be described with reference to FIGS. 2 and 3. Additionally, the device 20 illustrated in FIG. 2 is a content playback device for playing back content. Also, the device 20 illustrated in FIG. 3 is an image capturing device. Of course, the functional configurations of the device 20 shown in FIGS. 2 and 3 are only examples, and a home battery server, a notebook personal computer, a mobile phone, a portable information terminal and the like can also be adopted as the device 20.

(1-2-1: Content Playback Device)

First, FIG. 2 will be referred to. As shown in FIG. 2, the device 20 includes a connection unit 21, a charge storage unit 22, a storage unit 23, a content playback unit 24, and an output unit 25.

The connection unit 21 is means for connecting to the charging apparatus 10. When connection is made to the charging apparatus 10 via the connection unit 21, power is supplied from the charging apparatus 10. Then, the power supplied from the charging apparatus 10 is supplied to the charge storage unit 22. Also, when the charging apparatus 10 is connected, the connection unit 21 notifies the charging apparatus 10 of the amount of stored charge of the charge storage unit 22. Furthermore, the connection unit 21 transmits the content information stored in the storage unit 23 to the charging apparatus 10.

Content and content information are stored in the storage unit 23. This content is music data, video data, text data or the like, for example. Also, this content information is information such as a playback date/time of content. The content stored in the storage unit 23 is read and played back by the content playback unit 24. Then, the content played back by the content playback unit 24 is output by the output unit 25. The output unit 25 is a display device, speakers, or the like.

(1-2-2: Image Capturing Device)

Next, FIG. 3 will be referred to. As shown in FIG. 3, the device 20 includes a connection unit 21, a charge storage unit 22, a storage unit 23, an image capturing unit 26, a display unit 27, and a video playback unit 28.

The connection unit 21 is means for connecting to the charging apparatus 10. When connection is made to the charging apparatus 10 via the connection unit 21, power is supplied from the charging apparatus 10. Then, the power supplied from the charging apparatus 10 is supplied to the charge storage unit 22. Also, when the charging apparatus 10 is connected, the connection unit 21 notifies the charging apparatus 10 of the amount of stored charge of the charge storage unit 22. Furthermore, the connection unit 21 transmits the content information stored in the storage unit 23 to the charging apparatus 10.

The device 20 illustrated in FIG. 3 is an image capturing device. Accordingly, this device 20 is provided with the image capturing unit 26. The image capturing unit 26 is means for capturing an image of a subject. Additionally, the image capturing unit 26 can also record audio. Video data and audio data generated by the image capturing unit 26 are stored in the storage unit 23. Content and content information are stored in the storage unit 23. This content information is information such as a shooting date/time of the content. Additionally, the video that has been shot by the image capturing unit 26 is displayed on the display unit 27 as a through-the-lens video. Also, the content stored in the storage unit 23 can be played back by the video playback unit 28.

In the foregoing, the functional configuration of the device 20 has been described. The content playback device is a device that a user carries around daily. On the other hand, the image capturing device is a device that is highly probable to be brought out by a user at the time of an event or the like. By performing charge control while taking a behaviour pattern of a user into account, charge control that is more convenient for the user is realized. For example, an embodiment is conceivable that distinguishes between the content playback device and the image capturing device and that performs, for the image capturing device, charge control according to the weather by referring to the weather forecast. Additionally, the function of distinguishing between the devices 20 is realized by the schedule management unit 14.

[1-3: Charge Control Method]

Next, the charge control method according to the present embodiment will be described. The charge control method according to the present embodiment relates to a method of performing charge control such that the device 20 becomes fully charged at a timing suitable for the timing of use of the device 20 by a user.

(1-3-1: Charge Control Based on Content Information)

Figure 4:
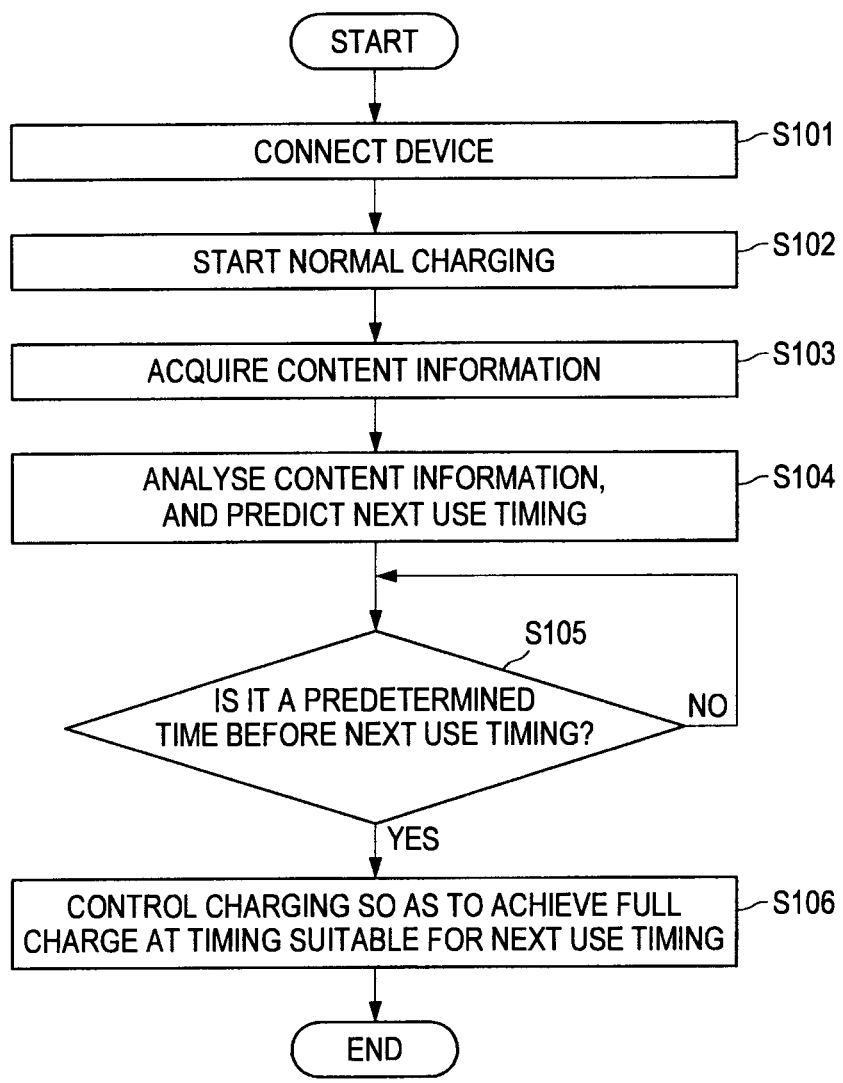
FIG. 4 is an explanatory diagram for describing a charge control method according to the embodiment (a method of using content information)

First, a charge control method based on content information acquired from the device 20 will be described with reference to FIG. 4. FIG. 4 is an explanatory diagram for describing a charge control method based on content information acquired from the device 20. Additionally, the charge control method shown in FIG. 4 is realized by using mainly the timing prediction unit 141, the use history acquisition unit 142 and the charge control unit 13 among the elements forming the charging apparatus 10.

As shown in FIG. 4, first, the device 20 is connected to the charging apparatus 10 via the connection unit 11 (S101). Then, the charging unit 12 starts normal charging of the device 20 connected via the connection unit 11 (S102). Additionally, control of the normal charge is performed by the charge control unit 13. Next, the use history acquisition unit 142 acquires content information from the device 20 connected via the connection unit 11 (S103). Then, the content information acquired by the use history acquisition unit 142 is input to the timing prediction unit 141.

Next, the timing prediction unit 141 analyses the content information input by the use history acquisition unit 142, and predicts the next use timing (S104). There are various methods for the prediction method of the use timing. For example, there is a method of detecting, based on the playback date/time of content included in the content information, a time range, within a day, in which the playback operation is highly frequently performed. There is also a method of separating weekdays and weekends and detecting a time range, on weekdays, in which the playback operation is highly frequently performed and a time range, on weekends, in which the playback operation is highly frequently performed. Still further, in a case there is a cycle, for each specific day, day of the week or season, regarding the time range in which the playback operation is performed, the next timing in the cycle may be taken as the prediction result on the next use timing.

The next use timing predicted by the timing prediction unit 141 is input to the charge control unit 13. When the next use timing is input, the charge control unit 13 determines whether or not the current time point is a predetermined time before the next use timing (S105). The use timing predicted from the content information is a timing at which a user will operate the device 20 after the device 20 is removed. Accordingly, the charge control unit 13 has to perform charge control such that the device 20 becomes fully charged at a time point that is a predetermined time before the use timing predicted based on the content information. Thus, the charge control unit 13 determines whether or not a time point that is a predetermined time before the next use timing predicted by the timing prediction unit 141 is reached.

In a case the current time point has reached the time point that is a predetermined time before the next use timing, the charge control unit 13 proceeds with the process to step S106. On the other hand, in a case the current time point has not reached the time point that is a predetermined time before the next use timing, the charge control unit 13 proceeds with the process again to step S105. When the process proceeds to step S106, the charge control unit 13 controls the charging unit 12 to achieve full charge at a timing suitable for the next use timing (S106). Additionally, since a user is to be allowed to use a fully charged device 20 at the next use timing, the charge control unit 13 controls the charging unit 12 such that the device 20 becomes fully charged a predetermined time before the next use timing.

In the foregoing, the charge control method based on the content information acquired from the device 20 has been described. By applying the charge control method described above, the life of the charge storage unit 22 (secondary cell) provided in the device 20 can be extended, while also enabling a user to use the device 20 that is fully charged. Also, since the user does not have to manually set the timing of achieving the full charge, the user's burden of operation can be reduced and the convenience can be greatly improved.

(1-3-2: Charge Control Based on Removal Timing)

Figure 5:
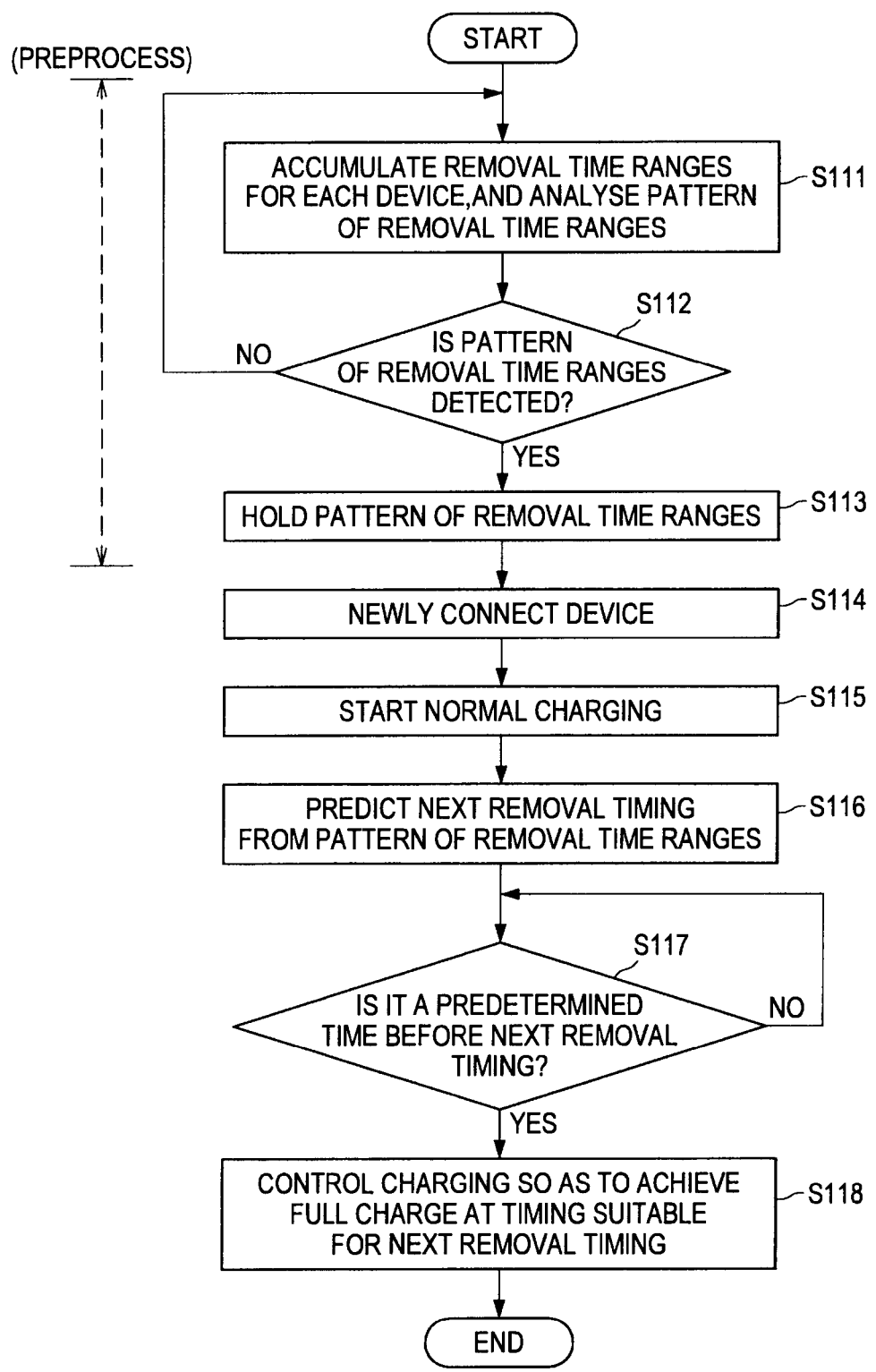
FIG. 5 is an explanatory diagram for describing a charge control method according to the embodiment (a method of using history of removal time ranges)

Next, a charge control method based on a history of timings of removal of the device 20 will be described with reference to FIG. 5. FIG. 5 is an explanatory diagram for describing a charge control method based on a history of timings of removal of the device 20. Additionally, the charge control method shown in FIG. 5 is realized by using mainly the timing prediction unit 141, the detachment time range storage unit 143 and the charge control unit 13 among the elements forming the charging apparatus 10.

As shown in FIG. 5, first, the charging apparatus 10 accumulates history of time ranges in which the device 20 is removed from the charging apparatus 10 (hereinafter, removal time range) and performs analysis on a pattern of the removal time ranges, by the detachment time range storage unit 143 and the timing prediction unit 141 (S111). Then, the charging apparatus 10 decides whether or not there is a pattern to the removal time ranges by the timing prediction unit 141 (S112). In a case there is a pattern to the removal time ranges, the charging apparatus 10 proceeds with the process to step S113. On the other hand, in a case there is no pattern to the removal time ranges, the charging apparatus 10 proceeds with the process again to step S111.

For example, in a case the device 20 is removed from the charging apparatus 10 in the same time range of the weekdays or the weekends, the charging apparatus 10 decides that there is a pattern to the removal time ranges. Also, in a case the device 20 is removed from the charging apparatus 10 in the same time range of the same day of the week, the charging apparatus 10 decides that there is a pattern to the removal time ranges. On the other hand, in a case the time range in which the device 20 is removed from the charging apparatus 10 is different every day, the charging apparatus 10 decides that there is no pattern to the removal time ranges. In the case the process proceeds to step S113, the charging apparatus 10 holds the detected pattern of the removal time ranges for each device 20 (S113).

Additionally, the process of steps S111 to S113 is a pre-process for realizing charge control based on the history of removal time ranges. It is difficult to detect the pattern of the removal time ranges with high accuracy unless a certain amount of history of removals is accumulated as information. Accordingly, the history of the removal time ranges is not used for prediction of the removal timing until a pattern of the removal time ranges is detected, and the process of step S111 is repeatedly performed.

In a case a device 20 is newly connected to the charging apparatus 10 after step S113 (S114), the charging unit 12 starts normal charging of the device 20 connected via the connection unit 11 (S115). Additionally, control of the normal charge is performed by the charge control unit 13. Then, the charging apparatus 10 predicts the next removal timing by the timing prediction unit 141 based on the pattern of the removal time ranges previously detected (S116). For example, in a case the removal time range according to the pattern previously detected is around 8 AM, the timing prediction unit 141 takes the time around 8 AM as the prediction result of the next removal timing.

The next removal timing that is predicted by the timing prediction unit 141 is input to the charge control unit 13. When the next removal timing is input, the charge control unit 13 determines whether or not the current time point is a predetermined time before the next removal timing (S117). Additionally, since a user is to be allowed to remove a fully charged device 20 at the next removal timing, the charge control unit 13 has to control the charging unit 12 such that the device 20 becomes fully charged a predetermined time before the next removal timing. The determination of step S117 is performed for this reason.

In a case the current time point has reached the time point that is a predetermined time before the next removal timing, the charge control unit 13 proceeds with the process to step S118. On the other hand, in a case the current time point has not reached the time point that is a predetermined time before the next removal timing, the charge control unit 13 proceeds with the process again to step S117. When the process proceeds to step S118, the charge control unit 13 controls the charging unit 12 to achieve full charge at a timing suitable for the next removal timing (S118).

In the foregoing, the charge control method based on the history of the removal time ranges of the device 20 has been described. By applying the charge control method described above, the life of the charge storage unit 22 (secondary cell) provided in the device 20 can be extended, while also enabling a user to use the device 20 that is fully charged. Also, since the user does not have to manually set the timing of achieving the full charge, the user's burden of operation can be reduced and the convenience can be greatly improved.

(1-3-3: Charge Control Based on Content Information+ Removal Timing)

Figure 6:
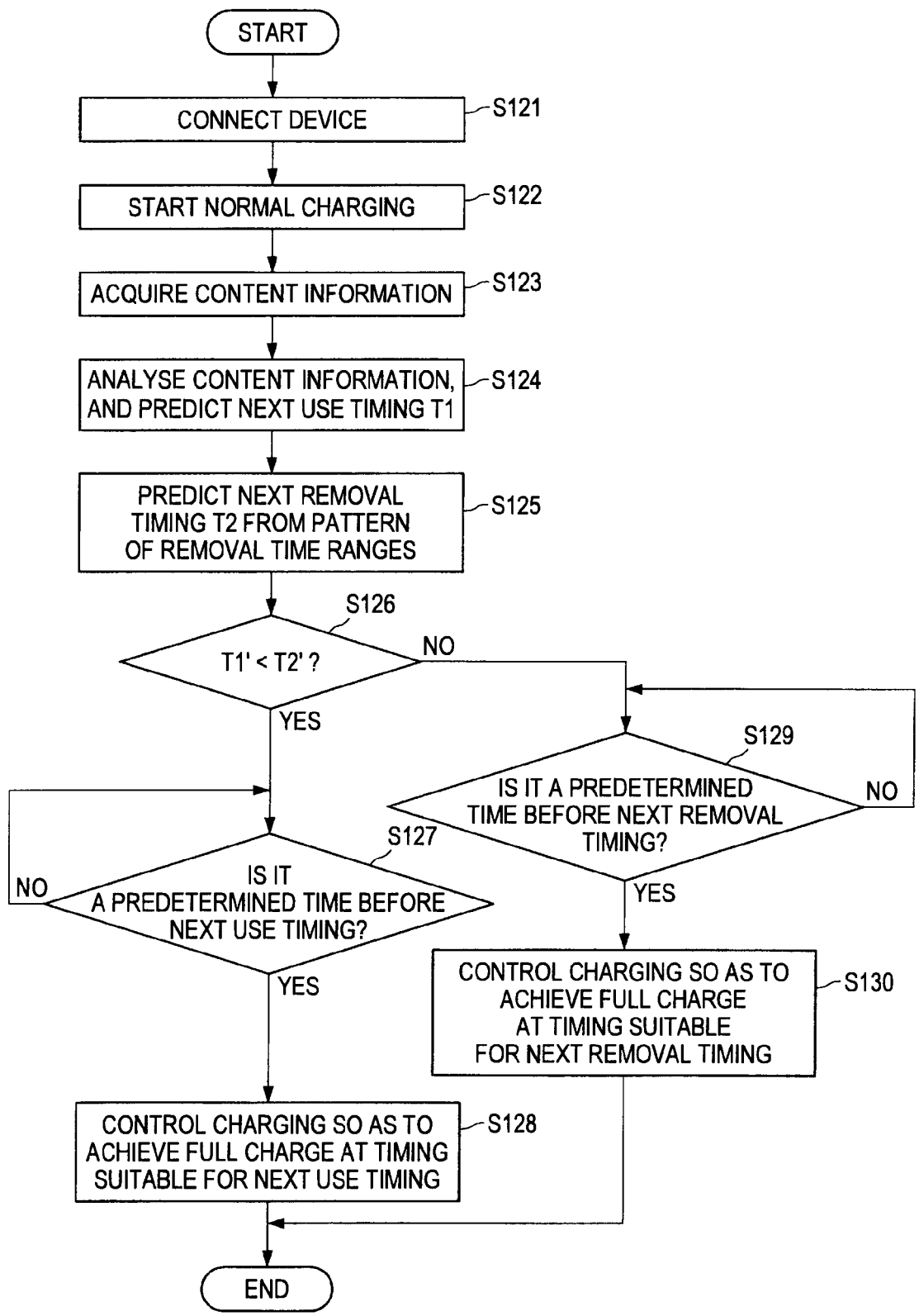
FIG. 6 is an explanatory diagram for describing a charge control method according to the embodiment (a method of using both content information and history of removal time ranges)

Next, a charge control method using both content information and a history of removal time ranges will be described with reference to FIG. 6. FIG. 6 is an explanatory diagram for describing a charge control method using both content information and a history of removal time ranges. Additionally, the charge control method shown in FIG. 6 is realized by using mainly the timing prediction unit 141, the use history acquisition unit 142, the detachment time range storage unit 143 and the charge control unit 13 among the elements forming the charging apparatus 10. Furthermore, in the explanation below, it is assumed that the process of steps S111 to S113 in FIG. 5 is already completed.

As shown in FIG. 6, first, the device 20 is connected to the charging apparatus 10 via the connection unit 11 (S121). Then, the charging unit 12 starts normal charging of the device 20 connected via the connection unit 11 (S122). Additionally, control of the normal charge is performed by the charge control unit 13. Then, the use history acquisition unit 142 acquires content information from the device 20 connected via the connection unit 11 (S123). Then, the content information acquired by the use history acquisition unit 142 is input to the timing prediction unit 141.

Next, the timing prediction unit 141 analyses the content information input by the use history acquisition unit 142, and predicts next use timing T1 (S124). The next use timing T1 predicted by the timing prediction unit 141 is input to the charge control unit 13. Furthermore, the timing prediction unit 141 predicts next removal timing T2 from the pattern of the removal time ranges (S125). The next removal timing T2 predicted by the timing prediction unit 141 is input to the charge control unit 13.

Next, the charge control unit 13 compares timing of full charge T1' based on the next use timing T1 and timing of full charge T2' based on the next removal timing T2, and determines whether it is T1'<T2' or not (S126). In the case it is T1'<T2', the charge control unit 13 proceeds with the process to step S127. On the other hand, in the case it is not T1'<T2', the charge control unit 13 proceeds with the process to step S129.

When the process proceeds to step S127, the charge control unit 13 determines whether or not the current time point is a time point (T1') that is a predetermined time before the next use timing T1 (S127). The use timing T1 predicted from the content information is a timing at which a user will operate the device 20 after the device 20 is removed. Accordingly, the charge control unit 13 has to perform charge control such that the device 20 becomes fully charged at a time point that is a predetermined time before the use timing T1 predicted based on the content information. Thus, the charge control unit 13 determines whether or not a time point T1' that is a predetermined time before the next use timing T1 predicted by the timing prediction unit 141 is reached.

In a case the current time point has reached the time point T1' that is a predetermined time before the next use timing T1, the charge control unit 13 proceeds with the process to step S128. On the other hand, in a case the current time point has not reached the time point T1' that is a predetermined time before the next use timing T1, the charge control unit 13 proceeds with the process again to step S127. When the process proceeds to step S128, the charge control unit 13 controls the charging unit 12 to achieve full charge at a timing suitable for the next use timing T1 (S128). Additionally, since a user is to be allowed to use a fully charged device at the next use timing T1, the charge control unit 13 controls the charging unit 12 such that the device 20 becomes fully charged a predetermined time T1' before the next use timing T1.

On the other hand, when the process proceeds from step S126 to step S129, the charge control unit 13 determines whether or not the current time point is a time (T2') that is a predetermined time before the next removal timing T2 (S129). Additionally, since a user is to be allowed to remove a fully charged device 20 at the next removal timing T2, the charge control unit 13 has to control the charging unit 12 such that the device 20 becomes fully charged at a time (T2') that is a predetermined time before the next removal timing T2. The determination of step S129 is performed for this reason.

In a case the current time point has reached the time point T2' that is a predetermined time before the next removal timing T2, the charge control unit 13 proceeds with the process to step S130. On the other hand, in a case the current time point has not reached the time point T2' that is a predetermined time before the next removal timing T2, the charge control unit 13 proceeds with the process again to step S129. When the process proceeds to step S130, the charge control unit 13 controls the charging unit 12 to achieve full charge at a timing suitable for the next removal timing T2 (S130). That is, the charge control unit 13 controls the charging unit 12 such that the device 20 becomes fully charged at the time T2' that is a predetermined time before the next removal timing T2.

In the foregoing, the charge control method based on the content information acquired from the device 20 has been described. By applying the charge control method described above, the life of the charge storage unit 22 (secondary cell) provided in the device 20 can be extended, while also enabling a user to use the device 20 that is fully charged. Also, since the user does not have to manually set the timing of achieving the full charge, the user's burden of operation can be reduced and the convenience can be greatly improved.

(1-3-4: Charge Control Based on Result of Weather Forecast)

Figure 7:
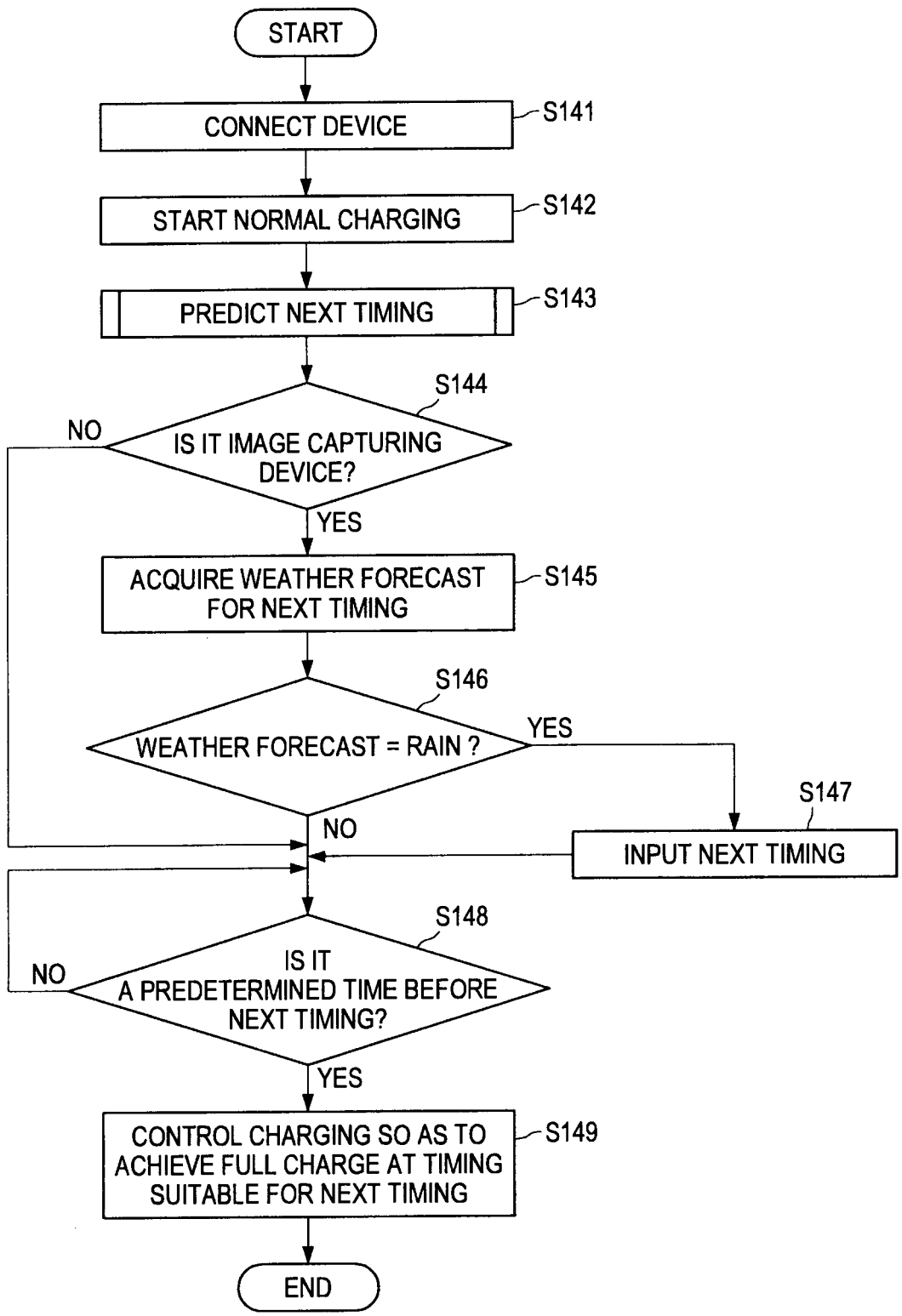
FIG. 7 is an explanatory diagram for describing a charge control method according to the embodiment (a method of using weather forecast)

Next, a charge control method according to a result of weather forecast will be described with reference to FIG. 7. FIG. 7 is an explanatory diagram for describing a charge control method according to a result of weather forecast. Additionally, the charge control method shown in FIG. 7 is realized by using mainly the timing prediction unit 141, the charge control unit 13 and the information acquisition unit 17 among the elements forming the charging apparatus 10.

As shown in FIG. 7, first, the device 20 is connected to the charging apparatus 10 via the connection unit 11 (S141). Then, the charging unit 12 starts normal charging of the device 20 connected via the connection unit 11 (S142). Additionally, control of the normal charge is performed by the charge control unit 13. Then, the timing prediction unit 141 predicts a next timing (S143). Additionally, the timing predicted in step S143 is the timing at which the device 20 will be used next. This timing is a prediction result that is based on CGM information (event schedule) or a prediction result that is based on trip information. Additionally, the next timing predicted in this manner is input to the charge control unit 13.

Then, the charging apparatus 10 determines, by the schedule management unit 14, whether or not the device 20 connected via the connection unit 11 is an image capturing device (S144). In the case the device 20 is an image capturing device, the charging apparatus 10 proceeds with the process to step S145. On the other hand, in the case the device 20 is not an image capturing device, the charging apparatus 10 proceeds with the process to step S148. When the process proceeds to step S145, the charging apparatus 10 acquires the weather forecast for the date/time of the next timing by the weather forecast acquisition function of the information acquisition unit 17 (S145). The weather forecast acquired in step S145 is input to the schedule management unit 14.

Then, the charging apparatus 10 determines whether or not the result of the weather forecast is rain, by the schedule management unit 14 (S146). In the case the result of the weather forecast is rain, the charging apparatus 10 proceeds with the process to step S147. On the other hand, in the case the result of the weather forecast is not rain, the charging apparatus 10 proceeds with the process to step S148. When the process proceeds to step S147, the charging apparatus 10 requests a user to perform an operation of inputting a next schedule by using the input unit 16 (S147). Then, when the next schedule is input by the user, the charging apparatus 10 proceeds with the process to step S148. Additionally, the next schedule input by the user is input to the charge control unit 13.

When the process proceeds to S148, the charging apparatus 10 determines whether or not the current time point is a predetermined time before the next timing, by the charge control unit 13 (S148). In a case the current time point has reached the time point that is a predetermined time before the next timing, the charge control unit 13 proceeds with the process to step S149. On the other hand, in a case the current time point has not reached the time point that is a predetermined time before the next timing, the charge control unit 13 proceeds with the process again to step S148.

When the process proceeds to step S149, the charge control unit 13 controls the charging unit 12 to achieve full charge at a timing suitable for the next timing (S149). Additionally, since a user is to be allowed to use a fully charged device 20 at the next timing, the charge control unit 13 controls the charging unit 12 such that the device 20 becomes fully charged a predetermined time before the next timing.

In the foregoing, the charge control method based on the content information acquired from the device 20 has been described. By applying the charge control method described above, the life of the charge storage unit 22 (secondary cell) provided in the device 20 can be extended, while also enabling a user to use the device 20 that is fully charged. Also, since the user does not have to manually set the timing of achieving the full charge, the user's burden of operation can be reduced and the convenience can be greatly improved. Furthermore, change of schedule due to rain can be easily coped with.

Additionally, rain is taken as an example of the result of weather forecast in the example of FIG. 7, but it can be replaced by any weather that will cancel or postpone an event or a trip.

(1-3-5: Charge Control Based on Event Information)

Figure 8:
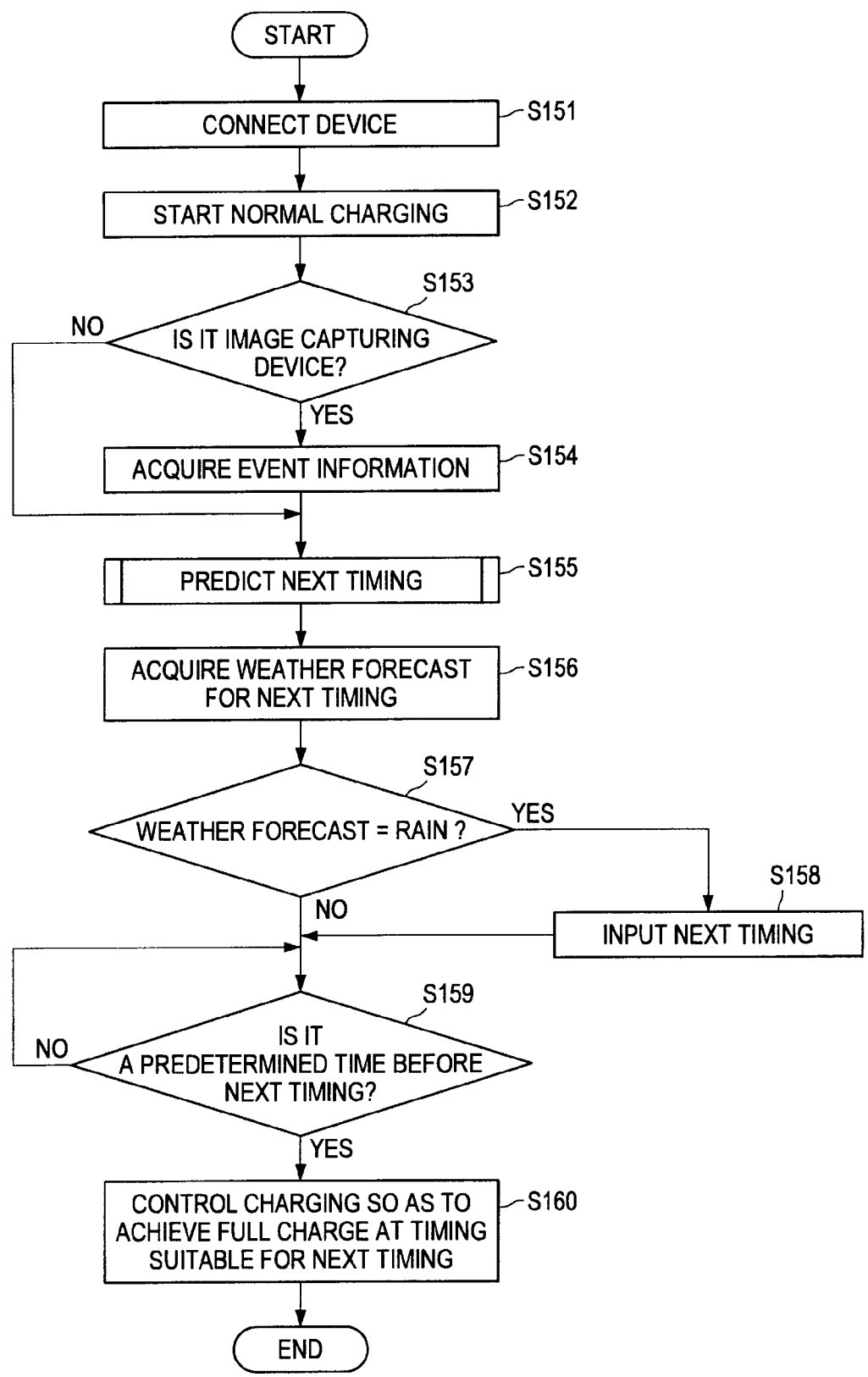
FIG. 8 is an explanatory diagram for describing a charge control method according to the embodiment (a method of using CGM information)

Next, a charge control method according to event information will be described with reference to FIG. 8. FIG. 8 is an explanatory diagram for describing a charge control method according to event information. Additionally, the charge control method shown in FIG. 8 is realized by using mainly the timing prediction unit 141, the charge control unit 13 and the information acquisition unit 17 among the elements forming the charging apparatus 10.

As shown in FIG. 8, first, the device 20 is connected to the charging apparatus 10 via the connection unit 11 (S151). Then, the charging unit 12 starts normal charging of the device 20 connected via the connection unit 11 (S152). Additionally, control of the normal charge is performed by the charge control unit 13. Then, the charging apparatus 10 determines, by the schedule management unit 14, whether or not the device 20 connected via the connection unit 11 is an image capturing device (S153). In the case the device 20 is an image capturing device, the charging apparatus 10 proceeds with the process to step S154. On the other hand, in the case the device 20 is not an image capturing device, the charging apparatus 10 proceeds with the process to step S155.

When the process proceeds to step S154, the charging apparatus 10 acquires event information for the date/time of the next timing by the CGM information acquisition function of the information acquisition unit 17 (S154). The event information acquired in step S154 is input to the schedule management unit 14. When the process proceeds to step S155, the timing prediction unit 141 predicts a next timing (S155). Additionally, the timing predicted in step S155 is a timing at which the device 20 will be used next. This timing is a prediction result based on the CGM information (event information). Additionally, the next timing is input to the charge control unit 13.

Then, the charging apparatus 10 acquires a weather forecast for the date/time of the next timing by the weather forecast acquisition function of the information acquisition unit 17 (S156). The weather forecast acquired in step S156 is input to the schedule management unit 14. Then, the charging apparatus 10 determines whether or not the result of the weather forecast is rain, by the schedule management unit 14 (S157). In the case the result of the weather forecast is rain, the charging apparatus 10 proceeds with the process to step S158. On the other hand, in the case the result of the weather forecast is not rain, the charging apparatus 10 proceeds with the process to step S159.

When the process proceeds to step S158, the charging apparatus 10 requests a user to perform an operation of inputting a next schedule by using the input unit 16 (S158). Then, when the next schedule is input by the user, the charging apparatus 10 proceeds with the process to step S159. Additionally, the next schedule input by the user is input to the charge control unit 13.

When the process proceeds to S159, the charging apparatus 10 determines whether or not the current time point is a predetermined time before the next timing, by the charge control unit 13 (S159). In a case the current time point has reached the time point that is a predetermined time before the next timing, the charge control unit 13 proceeds with the process to step S160. On the other hand, in a case the current time point has not reached the time point that is a predetermined time before the next timing, the charge control unit 13 proceeds with the process again to step S159.

When the process proceeds to step S160, the charge control unit 13 controls the charging unit 12 to achieve full charge at a timing suitable for the next timing (S160). Additionally, since a user is to be allowed to use a fully charged device 20 at the next timing, the charge control unit 13 controls the charging unit 12 such that the device 20 becomes fully charged a predetermined time before the next timing.

In the foregoing, the charge control method based on the content information acquired from the device 20 has been described. By applying the charge control method described above, the life of the charge storage unit 22 (secondary cell) provided in the device 20 can be extended, while also enabling a user to use the device 20 that is fully charged. Also, since the user does not have to manually set the timing of achieving the full charge, the user's burden of operation can be reduced and the convenience can be greatly improved. Furthermore, change of schedule due to rain can be easily coped with.

Additionally, rain is taken as an example of the result of weather forecast in the example of FIG. 8, but it can be replaced by any weather that will cancel or postpone an event or a trip.

(1-3-6: Charge Control Taking Demand Prediction into Account)

Figure 9:
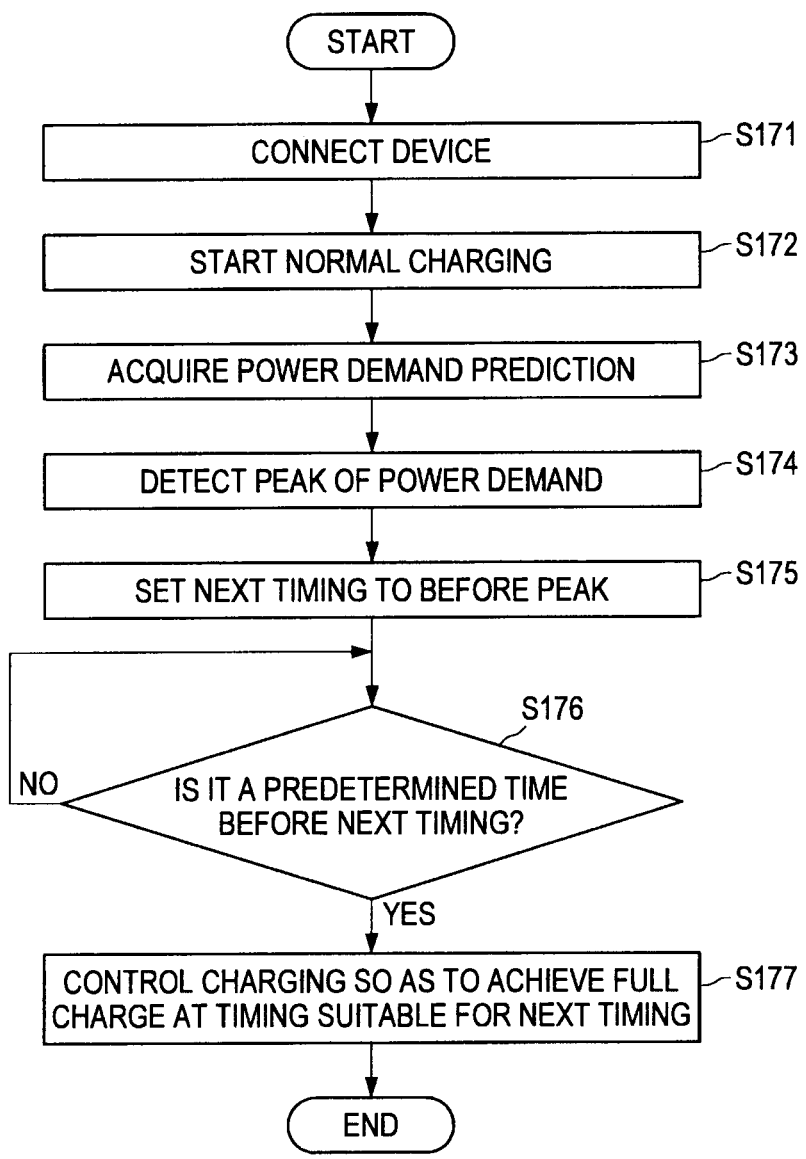
FIG. 9 is an explanatory diagram for describing a charge control method according to the embodiment (a method of using demand prediction)

Next, a charge control method that takes demand prediction into account will be described with reference to FIG. 9. FIG. 9 is an explanatory diagram for describing a charge control method that takes demand prediction into account. Additionally, the charge control method shown in FIG. 9 is realized by using mainly the timing prediction unit 141, the charge control unit 13 and the information acquisition unit 17 among the elements forming the charging apparatus 10.

As shown in FIG. 9, first, the device 20 is connected to the charging apparatus 10 via the connection unit 11 (S171). Then, the charging unit 12 starts normal charging of the device 20 connected via the connection unit 11 (S172). Additionally, control of the normal charge is performed by the charge control unit 13. Then, the charging apparatus 10 acquires prediction information on power demand by the demand prediction acquisition function of the information acquisition unit 17 (S173). The prediction information on power demand acquired in step S173 is input to the timing prediction unit 141.

Next, the timing prediction unit 141 detects a timing when the power demand reaches its peak from the prediction information on power demand that is input (S174). Then, the timing prediction unit 141 sets a next timing before the timing when the power demand reaches its peak (S175). Additionally, the timing that is set in step S175 is the timing at which the device 20 is to be fully charged next. Furthermore, this timing is input to the charge control unit 13.

Then, the charge control unit 13 determines whether or not the current time point is a predetermined time before the next timing (S176). In a case the current time point has reached the time point that is a predetermined time before the next timing, the charge control unit 13 proceeds with the process to step S177. On the other hand, in a case the current time point has not reached the time point that is a predetermined time before the next timing, the charge control unit 13 proceeds with the process again to step S176. When the process proceeds to step S177, the charge control unit 13 controls the charging unit 12 to achieve full charge at a timing suitable for the next timing (S177).

In the foregoing, the charge control method that takes demand prediction into account has been described. By applying the charge control method described above, the life of the charge storage unit 22 (secondary cell) provided in the device 20 can be extended, while also realizing charge control of the device 20 that takes into demand prediction into account. Also, since a user does not have to manually set the timing of achieving the full charge based on the demand prediction, the user's burden of operation can be reduced and the convenience can be greatly improved.

In the foregoing, the charge control methods according to the present embodiment have been described.

[1-4: Hardware Configuration]

Figure 10:
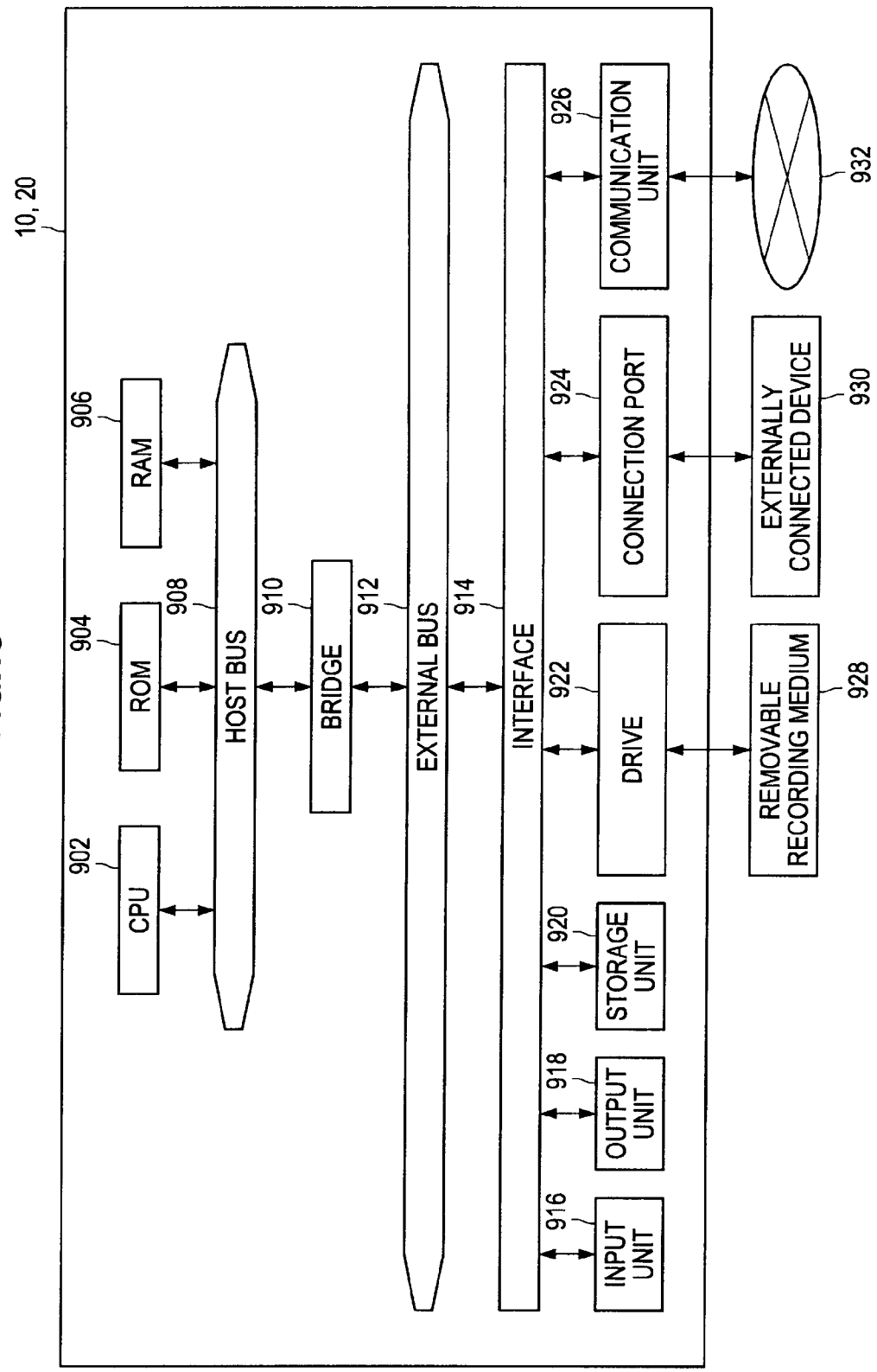
FIG. 10 is an explanatory diagram for describing a hardware configuration capable of realizing functions of the charging apparatus and the device according to the embodiment.

The function of each structural element of the charging apparatus 10 and the device 20 described above can be realized by using, for example, the hardware configuration shown in FIG. 10. That is, the function of each structural element can be realized by controlling the hardware shown in FIG. 10 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 10, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

2: Summary

Lastly, the technical contents according to the embodiment of the present disclosure will be briefly described. The technical contents stated here can be applied to a charging apparatus for charging, for example, a personal computer, a mobile phone, a portable game machine, a portable information terminal, an information appliance, a car navigation system, and the like.

The functional configuration of the charging apparatus described above can be expressed as below. The charging apparatus includes a connection unit, a charging unit, a history acquisition unit, a timing prediction unit and a charge control unit as below. The connection unit is means to which a device is to be connected. Also, the charging unit is means for charging the device connected to the connection unit. Furthermore, the history acquisition unit is means for acquiring a history of content use stored in the device. For example, in a case the device described above is a music player or a video player, the history acquisition unit acquires a playback history or the like of a music piece or a video.

Furthermore, the timing prediction unit is means for predicting a timing of use of the device based on the history of content use acquired by the history acquisition unit. When the history of content use can be grasped, the date/time or the time range of use of the device can be found out. If there is a pattern to the time range of use of content, the use timing of the device can be predicted based on the pattern. For example, in a case content is played back in a time range 8 AM to 9 AM, it can be predicted that the device will be used at around 8 AM.

Thus, the charge control unit controls the charging unit such that the device connected to the connection unit becomes fully charged at a timing suitable for the timing predicted by the timing prediction unit. By achieving full charge at a timing suitable for the use timing of the device predicted from content information, a user is enabled to use a fully charged device. On the other hand, since full charge is not achieved until the timing of start of use by the user, the life of the secondary cell provided in the device can be greatly increased.

(Notes)

The use history acquisition unit 142 is an example of a history acquisition unit. The detachment time range storage unit 143 is an example of a removal time range holding unit. The schedule management unit 14 is an example of an image capturing device determination unit. The information acquisition unit 17 is an example of a demand prediction acquisition unit.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-155113 filed in the Japan Patent Office on Jul. 7, 2010, the entire content of which is hereby incorporated by reference.

What is claimed is:

1. A charging apparatus comprising:
   a connection unit to which a device is to be connected;
   a charging unit configured to charge the device connected to the connection unit;
   a history acquisition unit configured to acquire a history of content use stored in the device;
   a removal time range holding unit configured to hold a time range during which the device connected to the connection unit is removed;
   an information acquisition unit configured to:
      identify first information directly from an information source on a network, the first information being related to an event; and
      acquire the identified first information directly from the information source;
   a timing prediction unit configured to:
      predict a first timing of use of the device based on the history of content use acquired by the history acquisition unit;
      determine a first timing of full charge based on the predicted first timing of use;
      detect second information related to a use of the device from the acquired first information;
      predict a second timing of use of the device based on the detected second information;
      determine a second timing of full charge based on the predicted second timing of use;
      predict a timing of removal of the device from the connection unit, based on a history of time range held by the removal time range holding unit; and
      determine a third timing of full charge based on the predicted timing of removal;
   and
   a charge control unit configured to:
      compare the first timing of full charge, the second timing of full charge, and the third timing of full charge, and control the charging unit such that the device becomes full charged at the earliest of the first timing of full charge, the second timing of full charge, and the third timing of full charge.

2. The charging apparatus according to claim 1, wherein the charge control unit is further configured to control, when the device is connected to the connection unit, the charging unit to charge the device to a predetermined amount of charge that is less than full charge, regardless of the timings predicted by the timing prediction unit.

3. The charging apparatus according to claim 1, further comprising an image capturing device determination unit configured to determine whether the device connected to the connection unit is an image capturing device;
   wherein the acquired first information includes weather forecast information, and
   wherein the charge control unit is further configured to:
      predict whether the device will be used at the predicted first or second timings of use, based on the determination of the image capturing device determination unit and the weather forecast information;
      upon predicting that the device will not be used at the predicted first or second timings of use, receive a fourth timing, and control the charging unit such that the device becomes fully charged at or before the fourth timing.

4. The charging apparatus according to claim 1,
   wherein the first information acquired by the information acquisition unit includes information about an event schedule, and
   wherein the predicted second timing of use is at a predetermined time before a start time of the event schedule.

5. The charging apparatus according to claim 1, further comprising:
   a demand prediction acquisition unit configured to acquire a power demand prediction,
   wherein the timing prediction unit is configured to determine a fifth timing based on the acquired power demand prediction, and
   wherein the charge control unit is configured to control the charging unit such that the device connected to the connection unit becomes fully charged at the fifth timing.

6. A charge control method comprising:
   connecting a device to a charging apparatus;
   acquiring a history of content use stored in the device;
   acquiring a history of time range during which the device is removed;
   identifying, directly from an information source on a network, first information related to an event;
   acquiring the identified first information directly from the information source on the network;
   predicting a first timing of use of the device based on the acquired history of content use;
   determining a first timing of full charge based on the predicted first timing of use;
   detecting second information related to a use of the device from the acquired first information;
   predicting a second timing of use of the device based on the detected second information;
   determining a second timing of full charge based on the predicted second timing of use;
   predicting a timing of removal of the device based on the acquired history of time range;
   determining a third timing of full charge based on the predicted timing of removal;
   comparing the first timing of full charge, the second timing of full charge, and the third timing of full charge; and
   controlling the charging apparatus such that the device becomes full charged at the earliest of the first timing of full charge, the second timing of full charge, and the third timing of full charge.

7. The charge control method according to claim 6, further comprising:
- determining whether the device connected to the charging apparatus is an image capturing device;
- wherein the acquired first information includes weather forecast information, and
- wherein the charge control method further comprises:
    - predicting whether the device will be used at the predicted first or second timings of use, based on the determination of whether the device is an image capturing device, and the weather forecast information;
    - upon predicting that the device will not be used at the predicted first or second timings of use, receiving a fourth timing, and controlling the charging apparatus such that the device becomes fully charged at or before the fourth timing.

* * * * *